UnitedStates Patent Office 3,336,192
Patented Aug. 15, 1967

3,336,192
ANTHELMINTIC SUBSTITUTED BENZIMIDAZOLE COMPOSITIONS
Lewis H. Sarett, Princeton, and Horace D. Brown, Plainfield, N.J., assignors to Merck & Co., Inc., Rahway, N.J., a corporation of New Jersey
No Drawing. Original application Dec. 23, 1963, Ser. No. 332,844. Divided and this application Aug. 30, 1966, Ser. No. 575,955
6 Claims. (Cl. 167—53)

This application is a division of our co-pending application Ser. No. 332,844, filed Dec. 23, 1963, which is in turn a continuation-in-part of our application Ser. No. 324,845, filed Nov. 19, 1963, and now abandoned.

This invention relates generally to new chemical compounds. More particularly, it relates to derivatives of heterocyclic compounds. Still more specifically it is concerned with benzimidazoles, benzoxazoles and benzothiazoles which have attached at the 5- or 6-position a heteroaromatic radical. It is concerned further with the methods of making such compounds. It is also concerned with the use of such compounds and compositions containing them in the treatment and prevention of helminthiasis.

The infection known as helminthiasis involves infestation with various species of parasitic worms of the animal body, particularly the gastrointestinal tract. It is a common, widespread and serious disease, methods for the treatment and prevention of which have not been entirely satisfactory. It is one object of the present invention to provide novel compounds. It is a further object to provide methods of synthesizing such compounds. It is a still further object of this invention to provide a method for preparing anthelmintic compositions containing such compounds. It is another object of this invention to provide a group of substituted benzimidazoles, benzoxazoles and benzothiazoles which are effective in controlling helminthiasis. Still another object of this invention is to provide anthelmintics particularly useful against ascarids. Other objects will become apparent from the following description of the invention.

According to the instant invention, it has now been found that certain benzimidazoles, benzoxazoles and benzothiazoles having at the 2-position a heterocyclic group containing nitrogen, oxygen and/or sulfur as the hetero atoms and more particularly those further substituted at the 5- or 6-position on the benzazole nucleus with a heteroaromatic radical have anthelmintic activity, and that some of them have a surprising degree of activity against swine ascarids.

Among the helmintic parasites, the methods of the genera Haemonchus, Trichostrongylus, Ostertagia, Nematodirus, Cooperia bunostomum, Oesophagostomum, Chabertia, Trichuris, Ascaris, Capillaria, Heterakis and Ancylostoma are the most common parasites of domestic animals. The diseases attributable to such infections, such as ascariasis, trichostrongylosis and gross parasitism, are very widespread and serious, the diseased host usually suffering from such conditions as malnutrition, anemia and hemorrhaging. Moreover, more advanced and uncontrolled cases of helminthiasis can lead to prostration and death.

In general the compounds of this invention have a surprisingly high degree of activity against the parasitic roundworm, Ascaris lumbricoides var. Suum. The aforementioned ascarid presents a serious economic problem in swine production, and death, stunting or other permanent injury to the host are a common result of infection. The adult worm inhabits the small intestines of the hog. The large number of eggs laid daily are passed out in the feces of the infected animal and continue to develop until ingested. The larvae then hatch, work their way to the blood stream, migrate to the liver, lungs and other organs and again find their way to the intestines where they mature. The liver and kidneys may show intensive changes because of the passage of the larvae through them.

The novel compounds within the scope of this invention may be represented by the formula

where R, $R_5$ and $R_6$ are heteroaromatic radicals containing from 1-3 hetero atoms wherein the hetero atoms are nitrogen, oxygen or sulfur, and provided one and only one of $R_5$ and $R_6$ is hydrogen; and A is oxygen, sulfur or $NR_1$, where $R_1$ is hydrogen, loweralkyl, aralkyl or acyl.

The new and novel compounds of this invention have a heterocyclic substituent at either the 5- or 6-position of the benzazole nucleus. Preferred are 5-membered monocyclic heteroaromatics having from 1-3 hetero atoms, these hetero atoms being nitrogen, oxygen and/or sulfur. Heteroaromatic radicals containing nitrogen, such as imidazolyl and pyrryl, containing oxygen such as furyl, containing sulfur, such as thienyl, and those containing nitrogen and sulfur, such as thiazolyl, isothiazolyl, and thiadiazolyl, represent examples of those substituents according to this invention which are located at the 5- or 6-position on the benzazole nucleus. As illustrative of heteroaromatic radicals which may be present at the 5- or 6-position on the benzazole nucleus, there may be mentioned 1'-imidazolyl, 2'-thiazolyl, 4'-thiazolyl, 4'-isothiazolyl, 4'-1,2,5 thiadiazolyl, 2'-thienyl, 3'-thienyl, 2'-furyl and 2'-pyrryl.

In addition to having a heterocyclic substituent at the 5- or 6-position, the benzazoles of this invention also have a heterocyclic radical at the 2-position (R in Formula I). It is preferred that this be a monocyclic heteroaromatic 5- or 6-membered ring that contains from 1-3 hetero atoms. The hetero atoms are oxygen, sulfur and/or nitrogen. Examples of such heterocyclic radicals are those containing only nitrogen such as pyrryl and pyridyl, those containing oxygen such as furyl, and those containing sulfur such as thienyl. The preferred compounds of the invention are those wherein the 2-substituent contains nitrogen and sulfur as hetero atoms, e.g., thiazolyl, isothiazolyl and thiadiazolyl.

At the 1-position of the benzimidazole nucleus there may be present alkyl, aralkyl or acyl radicals and the like. Among the alkyl radicals, lower alkyl such as methyl, ethyl, n-propyl and isopropyl are preferred whereas among the acyl radicals, alkanoyl radicals such as acetyl and propionyl, aroyl radicals such as benzoyl and toluoyl and aralkanoyl radicals such as phenacetyl are preferred. Benzyl is the preferred aralkyl radical which may be present at the 1-position.

When both nitrogen atoms on the benzimidazole nucleus are unsubstituted, one skilled in the art will appreciate that the hydrogen atom attached to one of the two nitrogen atoms in the ring will fluctuate between them creating a tautomeric molecule in which the 5- and 6-positions of the ring become equivalent. It is customary to describe these particular compounds as, for instance, a 5(6)-(4'-thiazolyl) benzimidazole or a 5(6)-(1'-imidazolyl) benzimidazole.

As illustrative of the novel substituted benzimidazoles, benzoxazoles and benzothiazoles falling within the scope of our invention and which may be prepared according to the methods described hereinbelow, there may be mentioned 2-(2'-thiazolyl)-5(6)-(4'-thiazolyl) benzimidazole,
2-(4'-isothiazolyl)-5(6)-(1'-imidazolyl) benzimidazole,
2-(2'-thiazolyl)-5(6)-(2'-furyl) benzimidazole,
2-(2'-furyl)-5(6)-(2'-thiazolyl) benzimidazole,
2-(4'-thienyl)-5(6)-(4'-isothiazolyl) benzimidazole,
2-(2'-pyrryl)-5(6)-(2'-thienyl) benzimidazole,
2-(4'-thiazolyl)-5(6)-(1'-imidazolyl) benzimidazole,
2-(4'-thiazolyl)-5-(2'-pyrryl) benzoxazole,
2-(2'-pyrryl)-6-(4'-1,2,3-thiadiazolyl) benzoxazole,
2-(4'-1,2,3-thiadiazolyl)-5-(4'-thiazolyl) benzoxazole,
2-(4'-thienyl)-5-(2'-thiazolyl( benzoxazole,
2-(4'-thienyl-5-(2'-thiazolyl) benzoxazole,
1-acetyl-2-(3'-pyridyl)-5-(4'-1,2,5-thiadiazolyl) benzimidazole,
2-(2'-thiazolyl)-5(6)-(3'-thienyl) benzimidazole,
2-(2'-furyl)-6-(1'-imidazolyl) benzothiazole,
1-benzoyl-2-(4'-thiazolyl)-5-(2'-thiazolyl) benzimidazole
and the like.

According to one process for the preparation of the compounds described by Formula I above and more specifically according to one process for the preparation of the benzimidazoles, such compounds may be prepared by reacting an appropriately substituted o-phenylenediamine such as 2-amino-4-(4'-thiazolyl) aniline and a heterocyclic carboxylic acid or derivative thereof such as the acid halide, nitrile, ester or amide in a mineral acid such as sulfuric, phosphoric or hydrochloric acid. The process is carried out at temperatures of from about 120–180° C. for about 3–10 hours. The optimum time and temperature will, of course, depend to some extent upon the particular reactions involved. Benzene, toluene, xylene, and the like may be used as solvents for one or more of the reactants.

Equimolar amounts of the heterocyclic compound and the diamine are preferred, and from about 5–20 parts by weight of acid/part of heterocyclic compound is desired. It will be appreciated that the relative amounts of acid is not critical. The desired benzimidazoles are recovered by cooling the reaction mixture and diluting it with water. Where the benzimidazoles do not readily crystallize after the above treatment, they are precipitated by treating the quenches mixture with a base.

According to another process for preparing the 5 or 6 substituted benzimidazoles of this invention, the novel compounds may be synthesized by reacting an appropriately substituted nitroaniline with a heterocyclic carboxylic acid or the corresponding ester or acid halide thereof, in a suitable inert solvent such as pyridine, benzene and the like. The nitro group on the resulting anilide is then reduced and benzimidazole formation effected by treatment of said anilide with a reducing system such as zinc-hydrochloric acid, zinc-acetic acid, iron-hydrochloric acid and the like or by catalytic reduction.

Additionally, an appropriately substituted aniline such as 2-(2'-thienyl) aniline may be reacted with a carboxylic acid or a derivative thereof and subsequently nitrated and reduced to give a second amino substituent. The resulting o-phenylenediamine may then be converted to the desired benzimidazole as hereinabove described.

Alternatively, the benzimidazoles of this invention may be prepared by reacting an appropriately substituted o-phenylenediamine and a heterocyclic carboxylic acid or derivative hereof in polyphosphoric acid, preferably at temperatures of about 175–275° C. for about 2–6 hours.

The substituted benzimidazoles may also be synthesized by reacting an o-phenylenediamine and a heterocyclic aldehyde such as thiazolyl-4-aldehyde, furyl-2-aldehyde, and the like in a reaction medium comprising nitrobenzene. Good results are obtained by heating the reaction mixture to reflux temperature for a short period of time. If desired, a solvent such as a lower alkanol may be used to promote the solubility of the reactants at lower temperatures. Such solvents are allowed to distill off during the heating period. The substituted benzimidazoles in many cases crystallize directly on cooling the nitrobenzene solution. Alternatively, they may be crystallized by addition of ether or petroleum-ether.

According to a further embodiment of the invention, the novel benzimidazoles are prepared by condensation of a heterocyclic aldehyde with an appropriately substituted o-phenylenediamine. The reaction is preferably brought about in a suitable solvent such as a lower alkanol. The intermediate product is the Schiff base of the aldehyde and the amine. Normally, this is not isolated but rather converted directly to the benzimidazole. The ring closure of the Schiff base to the benzimidazole is effected with a suitable oxidizing agent such as cupric acetate, lead tetraacetate, mercuric acetate, air and the like.

Where a heavy metal reagent is used to bring about benzimidazole formation from an o-phenylenediamine in the above process, an insoluble heavy metal salt of the 2-heterocyclic benzimidazole is formed. This material is readily converted to the free benzimidazole by removal of the heavy metal salt by reagents suitable to this purpose such as hydrogen sulfide, ammonium polysulfide, ammonium hydroxide and the like.

According to another process for making the benzimidazoles of the invention, an appropriately substituted aniline may be reacted with a heterocyclic nitrile in the presence of a suitable catalyst such as $AlCl_3$ to form an N'-phenylamidine derivative of the heterocyclic compound. Treatment of this latter substance with hydroxylamine to produce an N'-phenyl-N-hydroxyamidine derivative and reaction of this latter substance with an alkyl or aryl sulfonyl halide and then a base will produce the benzimidazole.

Still another method of preparing the benzimidazoles of this invention is that process by which the N'-phenylamidine described in the preceding paragragh is chlorinated or brominated to produce a N-chloro or N-bromo-N'-phenylamidine. This halogenation is brought about by reacting said N'-phenylamidine with a positive halogenating agent capable of halogenating the nitrogen atom of the amidine group. Suitable reagents for this purpose are N-haloamides or N-haloimides, for instance, N-chlorosuccinimide, N-bromacetamide and the like. When an N-haloamide or N-haloimide is used, a base in a sufficient amount to neutralize the acid addition salt of the N'-phenylamidine is employed. Suitable for this purpose is an alkali metal carbonate or hydroxide.

The preferred halogenating agents, however, are hypochlorous and hypobromous acid. These are conveniently formed in situ by addition of an alkali or alkaline earth metal hypohalite to a solution of the N'-phenylamidine acid addition salt, whereby neutralization of the acid addition salt and generation of the halogenating agent occur concurrently. Typical hypohalites useful for this purpose are sodium or potassium hypochlorite, sodium hypobromite and calcium hypobromite.

The N-halo-N'-phenyl amidine resulting from the above halogenation is converted to the benzimidazole by treatment with a base, such as an alkali or alkaline earth metal hydroxide such as sodium hydroxide, potassium hydroxide or calcium hydroxide.

One method of obtaining the 1-substituted benzimidazole of Formula I above is by converting the non-1-substituted compound to an alkali metal salt, preferably the sodium salt, by intimately contacting said compound with sodium hydride in a suitable solvent. A slight molar excess of sodium hydride gives satisfactory results and equimolar quantities of benzimidazole and sodium hydride may also be used if desired. The reaction is conveniently brought about by warming the reactants at slightly elevated temperatures, but room temperature gives satisfactory results.

A 1-substituted benzimidazole may then be obtained by contacting the benzimidazole alkali metal salt with an acyl halide such as benzoyl chloride, acetyl chloride, acetyl bromide, propionyl chloride and the like, an aralkyl halide such as benzyl chloride, or an alkyl halide, such as methyl chloride, ethyl chloride, methyl bromide and the like. Normally, the acyl halide, aralkyl halide or alkyl halide are added directly to a solution or suspension of the benzimidazole salt in an inert solvent and the reaction is allowed to proceed at a temperature of from about room temperature up to 100° C. Reaction temperatures in the range of 50–75° C. are preferred. The solvent employed as the reaction medium is preferably a hydrocarbon solvent such as benzene, toluene, xylene, petroleum ether and the like either alone or mixed with other solvents miscible therewith such as dimethylformamide.

The 5 and 6 substituted benzoxazoles and benzothiazoles of this invention are obtainable in a variety of ways. One method comprises reaction of an appropriately substituted o-aminophenol or o-aminothiophenol with a heterocyclic carboxylic acid or derivative thereof, such as an acid halide, ester, amide or nitrile. Reaction is carried out by intimately contacting the two materials in substantially equimolar amounts at elevated temperatures. The benzoxazole or benzothiazole is obtained by mixing the reactants either in or in the absence of an organic solvent medium. Presence of a solvent is preferred. An aromatic hydrocarbon such as benzene, toluene or xylene is satisfactory for this purpose. The process is conveniently carried out at a temperature of from about 70–120° C. When formation of the desired benzothiazole or benzoxazole is complete, the product may be isolated and purified by known methods such as by removal of the solvent under reduced pressure and either recrystallization or sublimation of the desired compound.

An additional method for making the benzoxazoles and benzothiazoles of the invention consists of the reaction of an appropriately substituted o-aminophenol or o-aminothiophenol with a heterocyclic carboxylic acid or a derivative thereof in a reaction medium comprising polyphosphoric acid. This process is particularly satisfactory for synthesizing the benzothiazoles and is preferably carried out by intimately contacting approximately equimolar amounts of the reactants in a medium comprising 5–20 parts by weight of polyphosphoric acid per part of carboxylic acid or its derivatives. The reaction is brought about by heating the mixture at temperatures of 150–215° C., preferably 180–200° C., for 2 to 4 hours. The benzothiazoles are then isolated by quenching the cooled reaction mixture with water and neutralizing the acid with a base such as calcium carbonate, an alkali metal hydroxide or carbonate, or ammonium hydroxide. This method is considered less satisfactory for making the benzoxazole compounds than the one previously described inasmuch as said benzoxazoles are less stable in the presence of hot mineral acid than are the corresponding benzothiazoles.

Still another method for synthesizing the benzoxazoles and benzothiazoles of this invention comprises the reaction of an appropriately substituted o-aminophenol or o-aminothiophenol with a heterocyclic aldehyde in a solvent such as a lower alkanol. The reaction proceeds to form the corresponding benzoxazoline or benzothiazoline, this compound then being converted to the benzoxazole or benzothiazole by oxidation with ferric chloride, lead tetraacetate, cupric acetate, mercuric acetate and the like.

The substituted benzimidazoles, benzoxazoles and benzothiazoles described hereinabove are useful in the treatment and/or prevention of helminthiasis in domesticated animals. For this purpose they may be administered orally as a component of the animal feed stuff, in the drinking water, in salt blocks, and in unit dosage forms such as boluses and drenches. The amount of active ingredient required for optimum control of helminthiasis, of course, varies in accordance with such factors as the particular compound employed, the species of animal to be treated, the species of infecting parasite, the severity of infection, and whether the compound is employed therapeutically or prophylactically. Generally, certain classes of the compounds of this invention have activities differing from those in other classes. For instance, the benzimidazoles of this invention generally exhibit greater activity than the corresponding benzoxazoles and benzothiazoles. In general the compounds described herein when administered orally to domestic animals in daily doses of from about 0.1 mg. to about 500 mg. per kilogram of animal body weight are highly effective in controlling helminthiasis without intolerable toxic effect. When the compounds are to be employed as therapeutic agents, good results are obtained when the animals are fed a daily dose of from about 5 mg. to about 500 mg. and preferably 15 mg. to 250 mg. per kilogram of body weight. Administration may be in a single dose or divided into a plurality of smaller doses over a period of 24 hours. Where prophylactic treatment is desired and the compounds are fed continuously, satisfactory results are obtained when the animal's ingest daily dosages are from about 0.1 mg. to 100 mg. per kilogram of body weight.

The compounds of this invention, when prepared as a unit dosage form such as a capsule, tablet, bolus, drench and the like, may be blended with one or more innocuous orally ingestible ingredients including diluents, fillers, binders, lubricants, disintegrating agents, suspending agents, wetting agents and the like. Suspending agents are particularly valuable when a drench is desired and should be used in such amount as to permit a uniform suspension of the active ingredient in water. The exact quantity of suspending agent to be employed will depend upon the concentration of active anthelmintic ingredient and the particular suspending agent being utilized.

The unit dosage forms may be readily prepared by conventional formulating techniques and are particularly useful when administration is to be made in a single dose or divided doses over a period of 24 hours. In addition to the earlier mentioned ingredients, the solid compositions may also contain a material which when associated with the active ingredient maintains the active ingredient in inert or inoperative form so long as the composition remains in the acidic stomach, but which releases the active ingredient when the composition reaches the intestine. Such compositions, because enteric in character, are particularly useful for the treatment of animals suffering from severe helmintic infection of the intestinal tract. Provision of such enteric property can, for example, be accomplished by coating tablets and boluses in a conventional manner with one of the commonly employed enteric coatings such as those containing fatty acids, resins, waxes, synthetic polymers and the like.

The exact amount of active ingredient to be employed in the above compositions may vary provided that a sufficient amount is ingested to give the required dosage. In general, tablets, boluses and drenches containing from about 5 to 70% by weight of active ingredient may be satisfactorily employed to supply the desired dosage. A typical example of a bolus which may be used in accordance with the teaching of the invention is as follows:

| | Grams |
|---|---|
| 2 - (4' - thiazolyl) - 5(6) - (1' - imidazolyl) benzimidazole | 6.0 |
| Dicalcium phosphate | 1.0 |
| Starch | 0.7 |
| Guar gum | 0.16 |
| Talc | 0.11 |
| Magnesium stearate | 0.028 |

This bolus is prepared by thoroughly mixing the benzimidazole of the particle size finer than 60-mesh with 0.43 gm. of starch in the form of an aqueous starch paste. The resulting mixture is then granulated in the usual manner, passed through a #10-mesh screen and dried at about 40–50 C. for about 8 hours. The dried material is then passed through a #16-mesh screen after which the guar gum and the balance of the starch are added and the mixture thoroughly blended. The remainder of the ingredients are then added and the entire mass totally mixed. A bolus of the desired size is then prepared in a standard manner by means of compression.

A suitable drench would contain the following ingredient in about an ounce of drench composition:

| | | |
|---|---|---|
| 2-(2'-furyl)-5(6)-(4'-thiazolyl) benzimidazole | gm | 4.5 |
| Benzalkonium chloride | ml | 0.6 |
| Antifoam emulsion | gm | 0.06 |
| Hydroxyethylcellulose | gm | 0.3 |
| Sodium phosphate monobasic | ml | 0.3 |
| Water, to | ml | 30.0 |

The levels of anthelmintic in these unit dosage forms may be varied within reasonable limits without altering the amounts of the other ingredients in the composition.

The benzimidazoles, benzoxazoles and benzothiazoles of this invention may be administered, dispersed in or admixed with the normal elements of animal sustenance, i.e., the feed, drinking water or other liquids normally partaken by the animals. This method is preferred when it is desired to administer the active compounds continuously, either as a therapeutic or prophylactic agent, for a period of several days or more. However, in such usage, it is to be understood that the present invention also contemplates the employment of compositions containing the active compounds intimately dispersed in or admixed with any other carrier or diluent which is inert with respect to the active ingredient, orally administrable and is tolerated by the animals. Such compositions may be utilized in the form of powders, pellets, suspensions and the like and are adapted to be fed to animals to supply the desired dosage or to be employed as concentrates or supplements and subsequently diluted with additional carrier or feed to produce the ultimate composition. Examples of carriers or diluents suitable for such compositions are solid orally ingestable carriers such as distillers' dried grains, alfalfa, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. In the preparation of solid compositions the active ingredient is intimately dispersed or admixed throughout the feed or other solid carrier by methods such as grinding, stirring, milling or tumbling. By selecting proper diluents and by altering the ratio of carrier to active ingredient, compositions of any desired concentration may be prepared.

As previously stated, the 5 and 6 substituted benzazoles of the invention in general have an unusually high degree of activity against swine ascarids such as *Ascaris lumbricoides*. When anthelmintics such as those of the present invention are used for treating animals such as swine and particularly when the treatment is for the purpose of preventing or freeing the host from ascarid infestation, the active agents are preferably administered as an ingredient of the feed. Where the compounds described according to Formula I above are provided as a constituent of the feed, the required dosage may be supplied with feed compositions containing from about 0.001%–3% by weight of the active compound. Such medicated feed compositions can be prepared for direct use by mixing the above amount of active ingredient directly with the feed. The medicated feeds may also be prepared by the use of feed supplements containing higher concentrations of the active ingredient uniformly dispersed in a solid edible carrier such as mentioned above. The feed supplements may then be diluted with the feed to produce the desired concentration of active ingredient for feed. Since it is convenient for the feed manufacturer to use about one pound of feed supplement for each ton of finished feed, the preferred concentration of active ingredient in the feed supplement is partly a function of the level of active ingredient desired in the finished feed. In general, feed supplements containing from about 5% to about 50% by weight of active ingredient may be satisfactorily employed to supply the desired dosage in the finished feed.

Examples of typical feed supplements containing the active compounds dispersed in a solid inert carrier are:

A.:
| | Pounds |
|---|---|
| 2 - (4' - thiazolyl) - 5(6) - (2'-thiazolyl) benzimidazole | 5 |
| Wheat shorts | 95 |

B.:
| | |
|---|---|
| 2 - (4' - thiazolyl)-5(6)-1-imidazolyl) benzimidazole | 15 |
| Ground oyster shells | 40 |
| Citrus meal | 45 |

C.:
| | |
|---|---|
| 2-(2'-furyl)-5(6)-(4'thiazolyl) benzimidazole | 25 |
| Corn meal | 75 |

D.:
| | |
|---|---|
| 2-(2'-thienyl)-5(6)-(2'-thienyl) benzimidazole | 30 |
| Soybean mill feed | 70 |

E.:
| | |
|---|---|
| 2-(4'-thiazolyl)-6-(2'-furyl) benzothiazole | 15 |
| Molasses solubles | 85 |

In the preparation of these and similar feed supplements the active ingredient is added to the carrier and the whole mixed to give substantially uniform dispersion of the anthelmintic agent in the carrier.

The examples following are given for the purpose of illustration and not by way of limitation.

EXAMPLE 1

*2-(4'-thiazolyl)5(6)-4'-imidazolyl-benzimidazole*

A suspension of 0.84 gm. (0.0027 mole) of N-[4'-(4 - imidazolyl)]-2'-nitro-4'-thiazolecarboxanilide, prepared by reaction of thiazole-4-carboxylic acid chloride and 4-(4'-aminophenyl) imidazole and nitrating with nitric acid, in 150 ml. of methanol and 1.3 ml. of concentrated hydrochloric acid is reduced at room temperature and 40 p.s.i. with 0.5 gm. of 5% palladium over activated charcoal as catalyst. The solution is filtered from the catalyst and concentrated to dryness at reduced pressure. The residue is redissolved in a mixture of 25 ml. of water, 25 ml. of ethanol, and 2.5 ml. of concentrated hydrochloric acid, and the solution refluxed for 4 hours. It is concentrated to dryness at reduced pressure. The residue is dissolved in alcohol and an excess of ether is added giving 2-(4'-thiazolyl)-5(6)-(4'-imidazolyl) benzimidazole.

EXAMPLE 2

*2-(4'-thiazolyl)-5(6)-(1'-imidazolyl) benzimidazole*

To thiazole-4-carboxylic acid chloride is added 200 ml. of toluene and 15.9 gm. of 1-(4'-aminophenyl) imidazole and the mixture is heated for 1 hour at reflux. The resulting solid is filtered giving 26.1 gm., M.P. 250° C. The product is then nitrated and reduced with palladium over carbon to yield the corresponding amine which is then dissolved in a mixture of 5 ml. of water, 5 ml. of ethyl alcohol and 5 ml. of concentrated HCl. The solution is treated at reflux for 3 hours, made neutral with concentrated ammonium hydroxide and evaporated to one-half of the original volume. The resulting tan solid, 2-(4'-thiazolyl)-5(6)-(1'-imidazolyl) benzimidazole, is then filtered and dried; M.P. 239–240° C.

When the above process is carried out employing 4-(4'-aminophenyl) thiazole instead of 1-(4'-aminophenyl) imidazole, 2-(4'-thiazolyl)-5(6)-(4'-thiazolyl) benzimidazole results.

When 2-(2'-aminophenyl) thiophene is used in place of 1(4'-aminophenyl) imidazole in the above process, 2-(4' - thiazolyl) - 5(6) - (2' - thienyl) benzimidazole is recovered as the product.

On the other hand, when the above process is carried out employing thiazole-2-carboxylic acid chloride, 1,2,5-thiodiazolyl-4-carboxylic acid chloride, isothiazole-4-carboxylic acid chloride, 2-furoic acid chloride, 3-thenoic acid chloride, or pyrole-2-carboxylic acid chloride instead of thiazole-4-carboxylic acid chloride, there is obtained 2-(2'-thiazolyl)-5(6)-(4'-thiazolyl) benzimidazole, 2-(4'-1,2,5 thiodiazolyl)-5(6)-(4'-thiazolyl) benzimidazole, 2-(4'-isothiazolyl)-5(6)-(4'-thiazolyl) benzimidazole, 2-(2'-furyl)-5(6)-(4'-thiazolyl) benzimidazole, 2-(3'-thienyl)-5(6)-(4'-thiazolyl) benzimidazole, or 2-(2'-pyrryl)-5(6)-(4'-thiazolyl) benzimidazole, respectively.

EXAMPLE 3

*2-(4'-thiazolyl)-5(6)-(2'-thiazolyl) benzimidazole*

To a solution of 1.06 gm. (9.6 M mole) of 4-cyanothiazole and 1.69 gm. 2-(4'-aminophenyl) thiazole in 10 ml. of tetrachloroethane is rapidly added with stirring 1.28 gm. (9.6 M mole) of aluminum chloride. The mixture is stirred at reflux for 20 minutes, allowed to cool and treated with 20 ml. of 5 NaOH. The black solid which forms is then separated by filtration and is completely dissolved by the addition of 50 ml. of methyl alcohol. The methyl alcohol solution is then added dropwise for 20 minutes to a stirred 5 NaOH solution (75 mole). The mixture is then stirred for 5 minutes, filtered and dried, giving tan crystalline amidine having a melting point of 146–150° C. Recrystallization from water ethanol gives N-4(2'-thiazolyl) phenyl(thiazole-4-amidine) melting at 150–153° C.

To a stirred solution of 500 mg. (1.75 M mole) of the amidine formed above in 5 ml. of methyl alcohol and 5 ml. of water adjusted to pH 4.5 with concentrated HCl is added ultimately 0.66 ml. of 2.89 N NaOCl. A solid precipitates. After stirring for 5 minutes, 0.084 gm. (2.11 mole) NaOH in 1 ml. of water is added. When heated to reflux almost complete solution of the solid results. Solution is then filtered and the filtrate allowed to cool at which time an oil deposits turning crystalline upon the addition of concentrated HCl; M.P. 202–206° C. Recrystallization from water hydrochloric acid gives the desired product melting at 206–207° C.

EXAMPLE 4

*2-(4'-thiazolyl)-5(6)-(5'-thiazolyl) benzimidazole*

To a solution of 1.14 gm. of 4-cyanothiazole in 4 ml. of tetrachloroethane is added 1.8 gm. 5-(4'-aminophenyl) thiazole. To this mixture 1.37 gm. of AlCl₃ is added with stirring. The resulting mixture is stirred at reflux for 25–30 minutes and when cooled a tan syrup which completely dissolves in 25 ml. of methyl alcohol results. The methyl alcohol is added dropwise to a stirred solution of 5 N sodium hydrochloride (75 ml.). The tan crystalline solid which forms, N-4(5'-thiazolyl) phenyl-thiazole-4-amidine, has a melting point of 175–177° C.

To a mixture of 25 ml. of methyl alcohol 10.9 gm. of the amidine formed above is added sufficient 50% HCl in methyl alcohol to bring the pH to 4. To the solution which results is added 1.33 ml. (2.92 ml.) of NaOCl with stirring for 10 minutes. Then 0.17 gm. of NaOH in 1 ml. of water is added and the solution heated at reflux for 45 minutes. The methyl alcohol is then reduced in volume to about 30% of the original and about 1 ml. of concentrated HCl. The desired product forms and is allowed to stand overnight at 10° C.; M.P. 230–232° C.

EXAMPLE 5

*2-(4'-thiazolyl)-5(6)-(4'-thiazolyl) benzimidazole*

To 10 ml. of tetrachloroethane is added 1.37 gm. (7.78 M mole) of 4-(4'-aminophenyl) thiazole and 0.80 gm. (7.78 M mole) of 4-cyanothiazole. To the stirred solution is added 1.04 gm. of AlCl₃ and the resulting solution is stirred at reflux for 1 hour at which time an oily residue is noted. The solvent is indicated and the residue dissolved in 20 ml. of methyl alcohol. This brown solution is added to 100 ml. of 4 NaOH with stirring. The resulting precipitate is filtered and washed with water. Upon double recrystallization from ethanol water, a melting point of 157–158° C. is displayed.

4 gm. of the above-produced amidine in 25 ml. of methyl alcohol is adjusted to pH 4.5 with concentrated HCl. To this yellow solution is added 5 ml. of N NaOCl. The dark resulting mixture is stirred for 5 minutes; 60 gm. of sodium hydroxide is added and the mixture heated at reflux for 45 minutes, the solvent removed in vacuo and the residue dissolved in 15% HCl. Concentrated NH₄OH is added to precipitate the desired benzimidazole; M.P. 135–140° C.

When 2-(4'-aminophenyl) pyrrole, 4-(4'-aminophenyl) isothiazole, 4-(4'-aminophenyl)-1,2,5-thiadiazole or 2-(4'-aminophenyl) furan is used in place of 4-(4'-aminophenyl) thiazole in the process above, there is obtained 2-(4'-thiazolyl) - 5(6)-(2'-pyrryl) benzimidazole, 2-(4'-thiazolyl) - 5(6) - (4'-isothiazole) benzimidazole, 2-(4'-thiazolyl) - 5(6) - (4'-1',2',5'-thiadiazole) benzimidazole or 2-(4'-thiazolyl)-5(6)-(2'-furyl) benzimidazole, respectively.

EXAMPLE 6

*2-(4'-thiazolyl)-5-(2'-thiazolyl) benzoxazole*

To thiazole-4-carboxylic acid chloride is added a solution of 3.6 gm. of 2-amino-4-(2'-thiazolyl) phenol in 40 ml. of pyridine. The mixture is heated on a steam cone for about 30 minutes and is then cooled and extracted with benzene. The extract is washed with dilute hydrochloric acid and water and is then chilled and filtered giving N-(4'-thiazolyl)-2-hydroxy - 5 - (2'-thiazolyl) anilide. The intermediate anilide is suspended in 150 ml. of xylene to which is added an equal amount of p-toluene sulfuric acid. The mixture is refluxed for 5 hours, washed with 10% sodium bicarbonate, dried over magnesium sulfate and evaporated to a residue under vacuum giving 2-(4'-thiazolyl)-5-(2'-thiazolyl) benzoxazole.

When the above process is carried out and 2-amino-4-(2'-thiazolyl) thiophenol is used in place of 2-amino-4-(2'-thiazolyl) phenol, 2-(4'-thiazolyl) - 5 - (2'-thiazolyl) benzothiazole.

EXAMPLE 7

*Acid addition salts*

When the benzimidazoles described herein are isolated as the free bases, they are readily converted to acid addition salts by treatment with acid. Typical salts which may be formed in this manner are mineral acid salts such as the hydrohalides, e.g., hydrochloride, hydrobromide, hydroiodide, sulfates, nitrates, phosphates and the like, aliphatic acid salts such as the acetate, trimethylacetate and propionate, salts of polycarboxylic acids such as the citrate, oxalate, succinate, and the like and salts of other insoluble organic acids such as the pamoate, embonate and hydroxynaphthoate salts. Some of these salts are more water soluble and some less water soluble than the free bases. It will be seen, therefore, that the solubility properties of a particular benzimidazole may be generally adjusted by judicious selection of a salt. When the benzimidazoles of this invention are used in salt form as anthelmintics, it is desirable that the particular acid employed be edible and non-toxic.

When 2-(4'-thiazolyl) - 5(6) - (1'-imidazolyl) benzimidazole is dissolved in ethanol and an excess of ethanolic hydrogen chloride and ethyl ether is added thereto, cooling and filtering of the mixture gives crystals of the hydrochloride acid addition salt of the benzimidazole.

EXAMPLE 8

*1-benzoyl-2-(4'-thiazolyl)-5-(1'imidazolyl) benzimidazole*

A 1:1 benzene-dimethylformamide mixture is added to 15 gm. of 2-(4'-thiazolyl) - 5(6) - (1'-imidazolyl) benzimidazole in a quantity sufficient to give substantial solution at reflux. Some benzene is distilled off and 0.06 M of sodium hydride suspended in dry benzene is added. The reaction mixture is stirred for about ½ hour and the sodium salt of the benzimidazoles forms. 8 gm. of benzoyl chloride in 10 ml. of dry benzene is added dropwise to the sodium salt and after 30 minutes of stirring at gentle reflux the reaction mixture is cooled, diluted with dry toluene and the organic layer is washed with cold water. The solution is then dried over magnesium sulfate, filtered, concentrated giving 1-benzoyl-2-(4'-thiazolyl-5-(1'-imidazolyl) benzimidazole.

If acetyl chloride is used in place of benzoyl chloride in the above process, 1-acetyl-2-(4'-thiazolyl)-5-(1'-imidazolyl) benzimidazole will result.

When benzyl chloride or methyl chloride is used in place of benzoyl chloride in the above process, there will result 1-benzyl-2-(4'-thiazolyl) - 5-(1'-imidazolyl) benzimidazole or 1-methyl-2-(4'-thiazolyl) - 5-(1'-imidazolyl) benzimidazole, respectively.

EXAMPLE 9

*1-(4'-aminophenyl) imidazole*

To a solution of 33.5 gm. of imidazole in 150 ml. of dimethylformamide is slowly added 26 gm. of sodium hydride. The mixture is stirred for about 30 minutes and it is then added to a solution of 78.8 gm. of p-chloronitrobenzene in 100 ml. of dimethylformamide. After an initial exothermic reaction takes place, the solution is refluxed for 1½ hours and poured into 1 l. of water. The precipitate is filtered, recrystallized from acetone, dissolved again in acetone and recrystallized to give N-(4'-nitrophenyl) imidazole; M.P. 195–198° C.

To 200 ml. of methanol is added 21.2 gm. of N-(4'-nitrophenyl) imidazole, 9.37 ml. of concentrated hydrochloric acid and 10 gm. of palladium adsorbed on carbon catalyst. The mixture is hydrogenated for 1½ hours, filtered and the filtrate concentrated to ⅓ its original volume. The solution is then diluted with 75 ml. of water and recrystallized with ammonium hydroxide. The precipitate formed is filtered and the filtrate evaporated under vacuum. The precipitate formed, N-(4'-aminophenyl) imidazole, melts at 141–143° C.

The general method for preparing benzimidazoles from N-phenylamidines by a process comprising chlorination of said amidine and treatment of the resulting N-halo-N'-phenylamidine with base, which method we employed in Examples 3–5 hereof, is the invention of our colleagues, Robert E. Jones and Victor J. Grenda, and is the subject matter of U.S. Ser. No. 315,677, filed by them on Oct. 11, 1963.

It should be understood that although this invention has been described with reference to particular embodiments thereof, changes and modifications may be made which are within its intended scope and it should be limited only by the language of the appended claims.

What is claimed is:

1. An anthelmintic composition comprising an anthelmintic compound of the formula

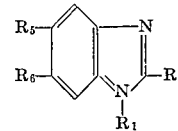

where R represents pyrryl, pyridyl, furyl, thienyl, thiazolyl, isothiazolyl or thiadiazolyl; $R_5$ and $R_6$ represent a 5-membered monocyclic hetero-aromatic radical having 1–3 hetero atoms selected from the group consisting of nitrogen, oxygen and sulfur, provided one and only one of $R_5$ and $R_6$ is hydrogen; and $R_1$ is a member of the group consisting of hydrogen, loweralkyl, phenylloweralkyl, loweralkanoyl, benzoyl, and phenylloweralkanoyl, intimately dispersed in an orally ingestible carrier which is inert with respect to said anthelmintic compound.

2. An anthelmintic composition of claim 1 wherein the benzimidazole compound is 2-thiazolyl - 5(6) - thiazolyl benzimidazole.

3. An anthelmintic composition of claim 1 wherein the benzimidazole compound is 2-(4'-thiazolyl)-5(6)-(4'-thiazolyl) benzimidazole.

4. An anthelmintic composition of claim 1 wherein the benzimidazole compound is 2-(4'-thiazolyl)-5(6)-(1'-imidazolyl) benzimidazole.

5. An anthelmintic composition of claim 1 wherein the benzimidazole compound is 2-(4'-thiazolyl)-5(6)-(2'-thienyl)benzimidazole.

6. An anthelminic composition as defined in claim 1 wherein the carrier is an animal feed.

References Cited

UNITED STATES PATENTS 3,155,571   11/1964   Sarett et al. _____ 167—53
3,192,108   6/1965    Brown et al. _____ 167—53

ALBERT T. MEYERS, *Primary Examiner.*

R. S. BARRESE, *Assistant Examiner.*